(12) United States Patent
Colas et al.

(10) Patent No.: US 12,350,726 B2
(45) Date of Patent: Jul. 8, 2025

(54) SPACE VEHICLE AND METHOD FOR MANUFACTURE THEREOF

(71) Applicant: NETWORK ACCESS ASSOCIATES LIMITED, London (GB)

(72) Inventors: Victor Colas, London (GB); Manraj Nagi, London (GB)

(73) Assignee: NETWORK ACCESS ASSOCIATES LIMITED, London (GB)

( * ) Notice: Subject to any disclaimer, the term of this patent is extended or adjusted under 35 U.S.C. 154(b) by 0 days.

(21) Appl. No.: 18/811,958

(22) Filed: Aug. 22, 2024

(65) Prior Publication Data

US 2024/0416406 A1 Dec. 19, 2024

Related U.S. Application Data

(63) Continuation of application No. PCT/IB2023/000105, filed on Feb. 24, 2023.

(30) Foreign Application Priority Data

Feb. 25, 2022 (FR) ...................................... 2201688

(51) Int. Cl.
*B21D 22/26* (2006.01)
*B64G 1/10* (2006.01)
*B64G 1/24* (2006.01)

(52) U.S. Cl.
CPC .............. *B21D 22/26* (2013.01); *B64G 1/10* (2013.01); *B64G 1/24* (2013.01); *B23P 2700/01* (2013.01);
(Continued)

(58) Field of Classification Search
CPC ....... B21D 22/26; B64G 1/10; B23P 2700/01; B23P 2700/50; Y10T 29/49346; Y10T 29/49622; Y10T 49/49968
See application file for complete search history.

(56) References Cited

U.S. PATENT DOCUMENTS 4,117,708 A * 10/1978 LaVene ................. B21D 35/00
72/404
4,397,434 A 8/1983 Farnham
(Continued)

FOREIGN PATENT DOCUMENTS

CN 112607057 A 4/2021
FR 3012055 A1 * 4/2015 ............. B21D 22/22
WO 2017060392 A1 4/2017

OTHER PUBLICATIONS

International Search Report and Written Opinion to corresponding International Application No. PCT/IB2023/000105, mailed Jun. 5, 2023, 10 pages.

*Primary Examiner* — Jermie E Cozart

(74) *Attorney, Agent, or Firm* — Greenberg Traurig, LLP

(57) ABSTRACT

A method includes providing a quantity of sheet metal, press-forming a first panel from the sheet metal to form a first stamped panel, press-forming a second panel from the sheet metal to form a second stamped panel, fixing at least one stiffener to the first stamped panel such that the stiffener extends across a width of the first panel, where a first end of the stiffener is attached to the first stamped panel at a first fixation location, and where a second end of the stiffener is attached to the first stamped panel at a second fixation location, fixing at least one onboard equipment component to the first stamped panel, where at least one of the at least one onboard equipment component is fixed to the stiffener, sealing the first panel to the second panel to form a space vehicle.

14 Claims, 7 Drawing Sheets

(52) U.S. Cl.
CPC ..... *B23P 2700/50* (2013.01); *Y10T 29/49346* (2015.01); *Y10T 29/49622* (2015.01); *Y10T 29/49968* (2015.01)

(56) References Cited

U.S. PATENT DOCUMENTS

| | | | | |
|---|---|---|---|---|
| 5,312,146 | A | | 5/1994 | Chicoine et al. |
| 5,755,406 | A | * | 5/1998 | Aston ................. B64G 1/1007 244/159.4 |
| 5,848,767 | A | * | 12/1998 | Cappa ..................... B64G 1/22 244/158.1 |
| 6,206,327 | B1 | * | 3/2001 | Benedetti ................. B64G 1/10 244/159.4 |
| 2001/0039712 | A1 | * | 11/2001 | Ruehl ..................... B62D 21/02 29/469 |
| 2004/0164588 | A1 | * | 8/2004 | Lutz ..................... B62D 29/002 296/187.02 |
| 2005/0034447 | A1 | * | 2/2005 | Joshi ....................... C06D 5/00 60/253 |
| 2005/0263645 | A1 | * | 12/2005 | Johnson ..................... B63B 3/36 244/119 |
| 2006/0185277 | A1 | * | 8/2006 | Quincieu ................. B64G 1/10 52/265 |
| 2011/0296675 | A1 | | 12/2011 | Roopnarine et al. |
| 2016/0130019 | A1 | * | 5/2016 | Jaeger ..................... B64G 1/66 62/7 |
| 2016/0288931 | A1 | | 10/2016 | Field et al. |

\* cited by examiner

SPACE VEHICLE AND METHOD FOR MANUFACTURE THEREOF

FIELD OF THE INVENTION

The field of the invention relates to space vehicles and methods for manufacturing such vehicles. More particularly, the field invention relates to space vehicles, such as satellites, having outer shells formed from stamped aluminum panels.

BACKGROUND OF THE INVENTION

Conventionally built satellites utilize sandwich panels having aluminum honeycomb cores to construct load-bearing structures. Such panels take advantage of the high stiffness-to-density ratio of honeycomb structures. However, honeycomb panels, while lightweight, are typically expensive and difficult to manufacture, and may require specially-designed interface structures in order to fix payload elements thereto.

SUMMARY OF THE INVENTION

The claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, a space vehicle includes an upper panel; a lower panel fixed to the upper panel around at least a portion of respective perimeters thereof to thereby form an enclosed structure having an interior volume; two stacking pillars at opposite sides of the enclosed structure; a stiffener extending across the interior volume, wherein the stiffener is fixed to the upper panel and the lower panel, and wherein the stiffener extends from a first end proximate a first one of the two stacking rings to a second end proximate a second one of the two stacking rings; and a plurality of payload elements, wherein each of the plurality of payload elements is fixed to at least one of the upper panel, the lower panel, or the stiffener, and wherein at least some of the plurality of payload elements lack a casing.

In some embodiments, a method includes providing a quantity of sheet metal, where the sheet metal comprises aluminum; press-forming a first panel from the sheet metal to form a first stamped panel; press-forming a second panel from the sheet metal to form a second stamped panel; providing at least one stiffener; fixing the at least one stiffener to the first stamped panel such that the stiffener extends across a width of the first panel, where a first end of the stiffener is attached to the first stamped panel at a first fixation location, and where a second end of the stiffener is attached to the first stamped panel at a second fixation location; providing at least one onboard equipment component; fixing the at least one onboard equipment component to the first stamped panel, where the at least one onboard equipment component does not comprise an outer casing, where at least one of the at least one onboard equipment component is fixed to the stiffener; sealing the first panel to the second panel to form a space vehicle.

In some embodiments, the method further includes providing at least one stacking pillar; and coupling the at least one stacking pillar to the space vehicle, where the at least one stacking pillar is configured to allow stacking of the space vehicle with at least one other space vehicle.

In some embodiments, fixing the at least one stiffener to the first stamped panel comprises bolting the at least one stiffener to the first stamped panel.

In some embodiments, the method further includes forming a layer of satellites by placing four of the space vehicles in a single layer within a circle having a diameter of 4.5 meters.

In some embodiments, the stiffener includes one of a circular cross-section, a T-shaped cross-section, an elliptical cross-section, an I-shaped cross-section, a C-shaped cross-section or a rectangular cross-section.

In some embodiments, the method further includes forming at least one pass-through through at least one of the first stamped panel or the second stamped panel, where the at least one pass-through is configured to allow communitive coupling of at least one external component of the space vehicle to at least one internal component of the space vehicle.

In some embodiments, each of the first stamped panel and the second stamped panel comprises a thickness of 0.1 mm to 10 mm.

In some embodiments, sealing the first panel to the second panel includes welding at least a portion of a perimeter of the first stamped panel to a least a portion of a perimeter of the second stamped panel.

In some embodiments, sealing the first panel to the second panel includes welding an entire perimeter of the first stamped panel to an entire perimeter of the second stamped panel.

In some embodiments, the space vehicle does not include an aluminum honeycomb core.

In some embodiments, the sheet metal includes an aluminum alloy.

In some embodiments, the stiffener includes an aluminum, a carbon fiber, or a carbon fiber reinforced polymer.

In some embodiments, the at least one onboard equipment includes at least one of an on-board computer, an optical inter satellites link transceiver, a power condition and distribution unit, an on-board processor, an optical terminal, one or more reaction wheels, a power processing unit, one or more gateway interface low and high power amplifiers, or a battery.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent how embodiments of the invention may be practiced.

DETAILED DESCRIPTION OF THE INVENTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, or identically acting elements in the various figures are identified with identical reference numbers and a repeated description of these elements is omitted in part to avoid redundancies.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The exemplary embodiments described herein relate to space vehicles, such as satellites, having outer shells made from stamped aluminum panels. The exemplary embodiments described herein also relate to methods for manufacture of such space vehicles.

Figure 1:
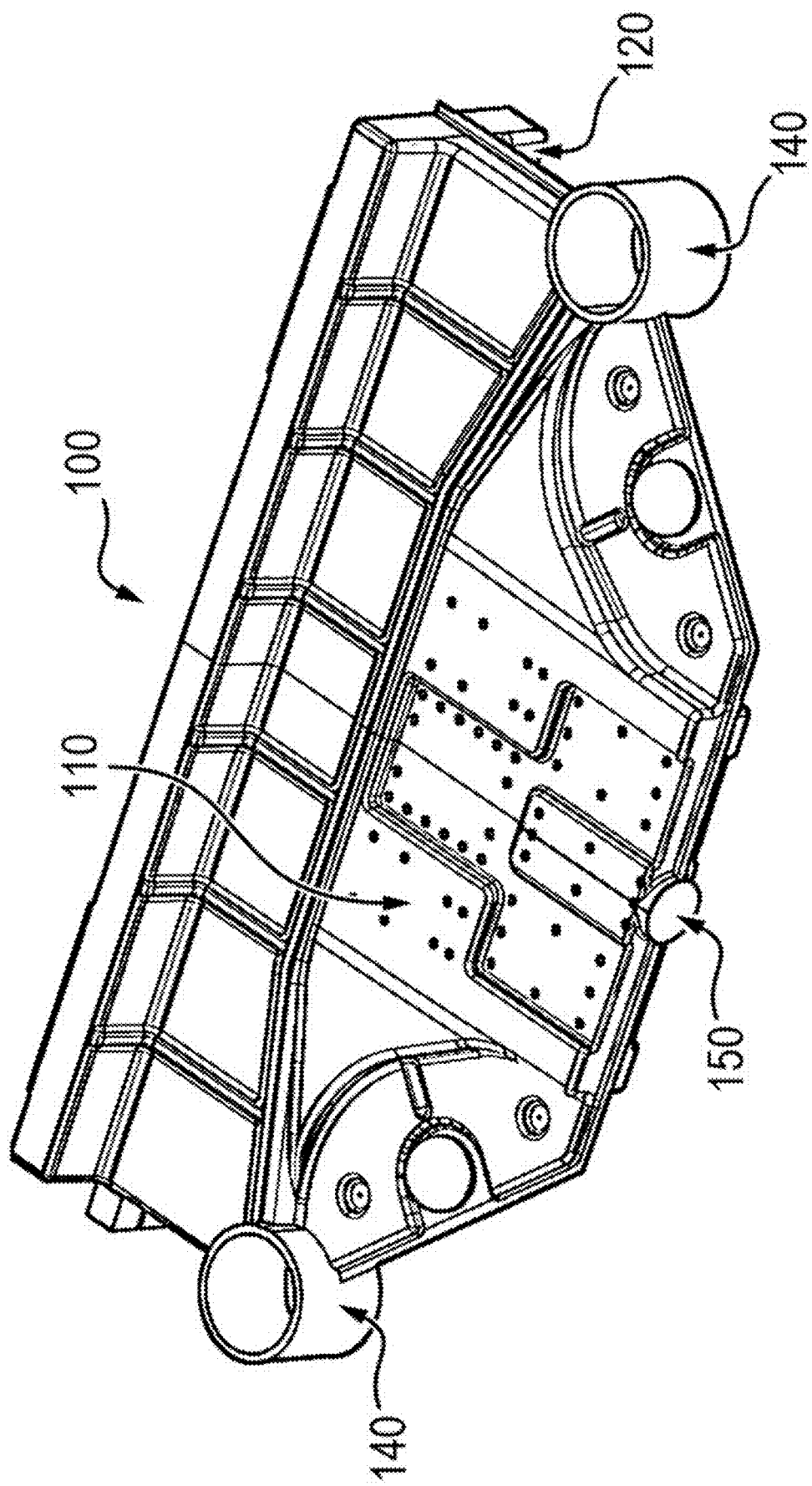
FIG. 1 shows a perspective view of an exemplary space vehicle, according to embodiments of the present disclosure.
Figure 2:
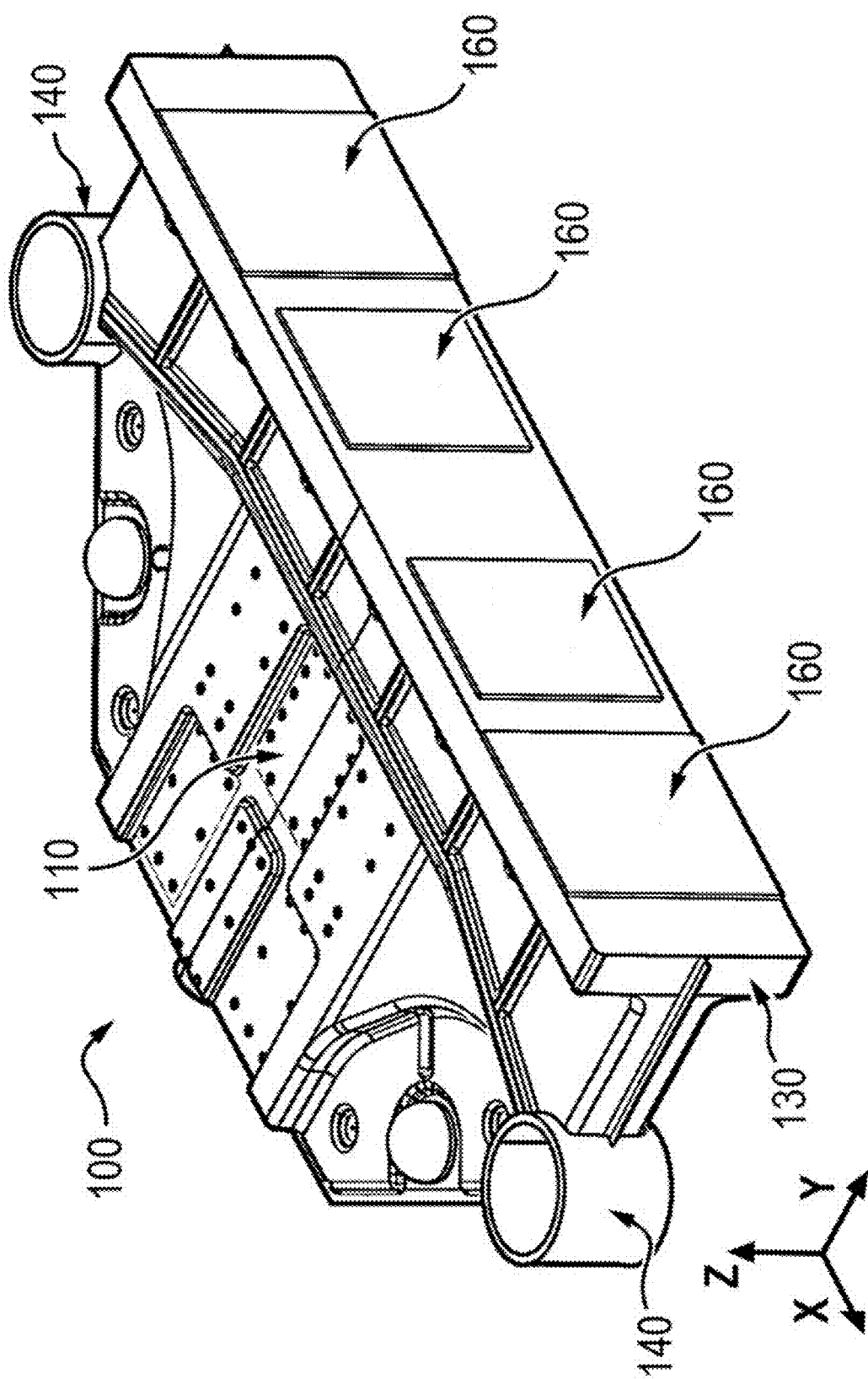
FIG. 2 shows a perspective view of an exemplary space vehicle, according to embodiments of the present disclosure.

FIGS. 1 and 2 show perspective views of opposite sides of a space vehicle 100, in the form of a satellite, in accordance with some embodiments of the invention. Although the figures show the space vehicle 100 as a satellite, it is understood that the disclosure is applicable to space vehicles other than satellites. In some embodiments, the space vehicle 100 includes a first panel 110 and a second panel 120 forming an outer shell of the space vehicle 100. In some embodiments, the panels 110, 120 include a metal. In some embodiments, the panels 110, 120 include a metal alloy. In some embodiments, the metal alloy includes at least one of an aluminum alloy, a steel alloy, and/or combinations thereof. In some embodiments, the aluminum alloy includes aluminum and zinc. In some embodiments, the aluminum alloy is a 7000-series aluminum alloy. In some embodiments, the aluminum alloy is 7075 aluminum. In some embodiments, the metal alloy includes an alloy other than steel and/or aluminum. In some embodiments, the panels 110, 120 include a composite. In some embodiments, the panels 110, 120 include a fiber composite. In some embodiments, the fiber composite includes at least one of a carbon fiber composite and/or a glass fiber composite. In some embodiments, the aluminum panels 110, 120 are press-formed. In some embodiments, the aluminum panels 110, 120 are press-formed from sheet aluminum. In some embodiments, the panels 110, 120 may be formed by a stamping process. In some embodiments, the panels 110, 120 may be formed by a material-removal process. In some embodiments, the panels 110, 120 may be formed by a molding process. In some embodiments, the panels 110, 120 may be formed by an injection process. In some embodiments, the panels 110, 120 may be formed by a 3-D printing process.

In some embodiments, the sheet aluminum has a thickness that is from 0.1 millimeter to 10 millimeters. In some embodiments, the sheet aluminum has a thickness that is from 1 millimeter to 10 millimeter. In some embodiments, the sheet aluminum has a thickness that is from 2 millimeter to 10 millimeters. In some embodiments, the sheet aluminum has a thickness that is from 5 millimeter to 10 millimeters.

In some embodiments, the sheet aluminum has a thickness that is from 0.1 millimeter to 5 millimeters. In some embodiments, the sheet aluminum has a thickness that is from 0.1 millimeter to 2 millimeters. In some embodiments, the sheet aluminum has a thickness that is from 0.1 millimeter to 1 millimeters.

In some embodiments, the sheet aluminum has a thickness that is from 1 millimeter to 3 millimeters. In some embodiments, the sheet aluminum has a thickness that is from 3 millimeters to 5 millimeters. In some embodiments, the sheet aluminum has a thickness that is from 5 millimeters to 10 millimeters. In some embodiments, the sheet aluminum is 1 millimeter in thickness. In some embodiments, the sheet aluminum is 2 millimeters in thickness.

In some embodiments, the sheet aluminum may include at least one thickening panel. In some embodiments, the at least one thickening panel may be formed as a result of the stamping process. In some embodiments, the sheet aluminum has a first thickness (e.g., 0.1 millimeter) in some regions and has one or more regions having a greater second thickness (e.g., 2 millimeters) provided by the addition of the at least one thickening panel.

In some embodiments, the first and second panels 110, 120 may be joined to one another around the perimeters of the first and second panels 110, 120. In some embodiments, the entire perimeters of the first and second panels 110, 120 are joined to one another, thereby to form an enclosed structure. In some embodiments, less than the entire perimeters of the first and second panels 110, 120 are joined to one another. In some embodiments, the first and second panels 110, 120 are welded to one another. In some embodiments, the first and second panels 110, 120 are welded to one another by spot welding, laser welding, or any other welding technique. In some embodiments, the first and second panels 110, 120 may be welded at discrete points along the respective perimeters thereof. In some embodiments, the first and second panels 110, 120 may be continuously welded along the respective perimeters thereof. In some embodiments the first and second panels 110, 120 are hermetically sealed. In some embodiments, the first and second panels 110, 120 are not hermetically sealed. In some embodiments, the first and second panels 110, 120 are adhered to one another. In some embodiments, the first and second panels 110, 120 are connected to one another by another process such as through the process of techniques such as welding, bolting, gluing or riveting.

Figure 3:
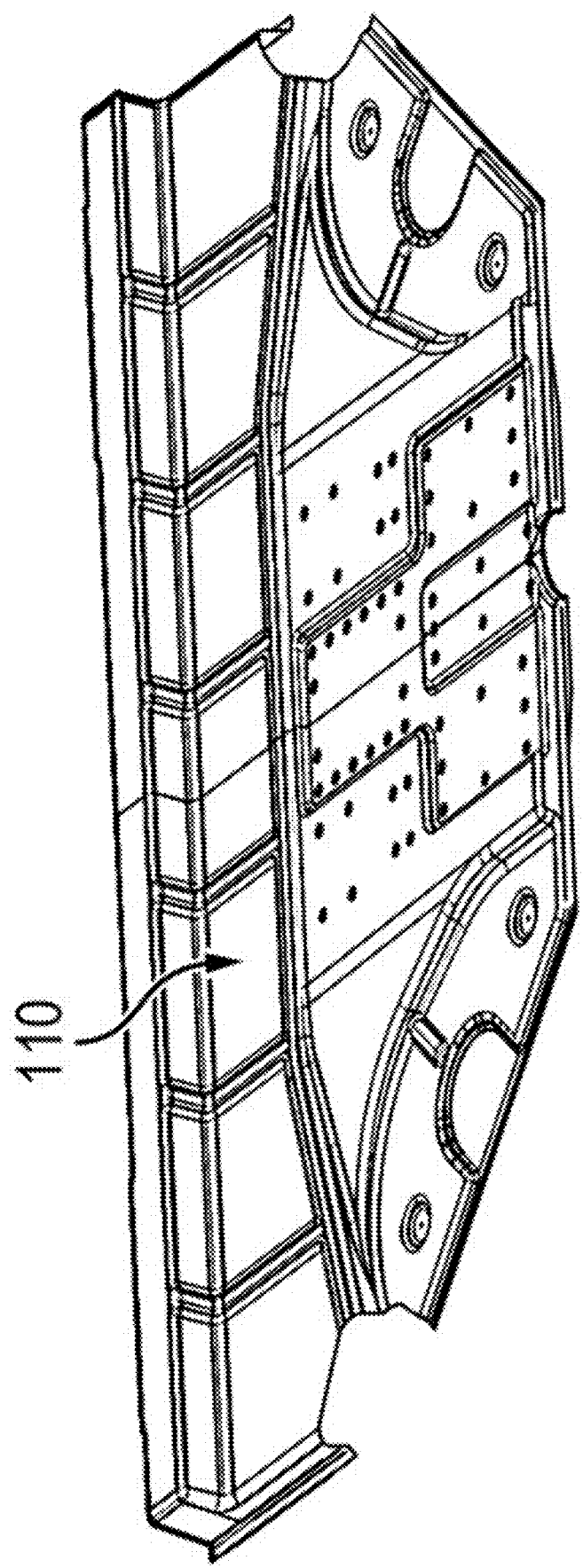
FIG. 3 shows a perspective view of a panel of an exemplary space vehicle, according to embodiments of the present disclosure.
Figure 4:
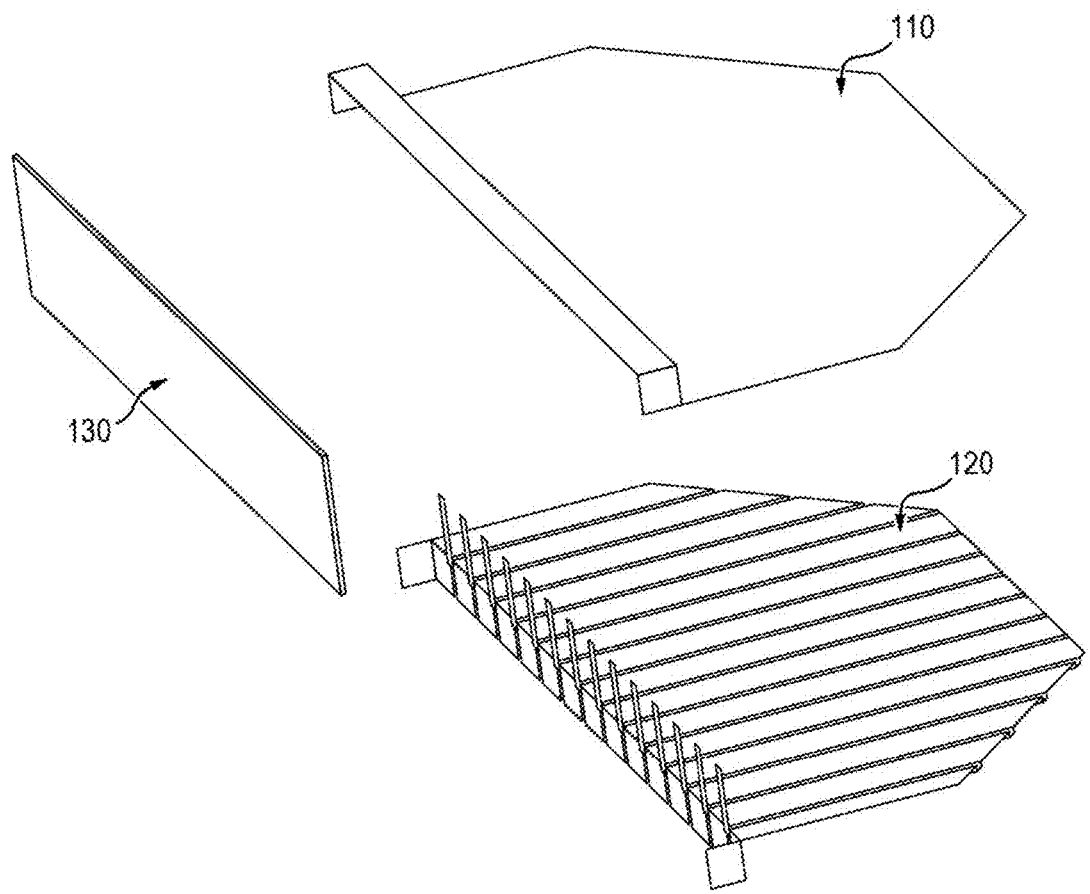
FIG. 4 shows an exploded perspective view of panels of an exemplary space vehicle, according to embodiments of the present disclosure.
Figure 5:
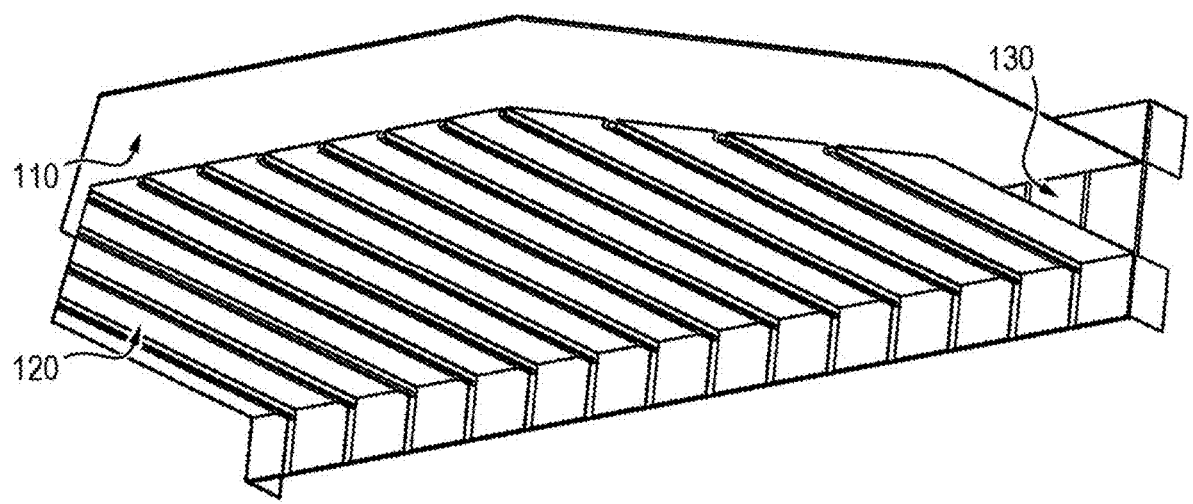
FIG. 5 shows an exploded perspective view of panels of an exemplary space vehicle, according to embodiments of the present disclosure.

FIG. 3 shows an exploded perspective view of the exemplary panel 110. FIG. 4 shows an exploded perspective view of the exemplary panels 110 and 120, together with an earth deck panel 130 that is configured to be positioned at a location of the space vehicle 100 that faces toward Earth when the space vehicle 100 is in orbit. FIG. 5 shows an additional perspective view of the panels 110 and 120 and the earth deck panel 130.

Referring back to FIGS. 1 and 2, in some embodiments, the exterior of the space vehicle 100 includes one or more stacking pillars 140. In some embodiments, the exterior of the space vehicle 100 includes a mounting interface for solar array wings. In some embodiments, the exterior of the space vehicle 100 includes one or more antenna modules 160 (e.g., transmitting antenna modules and receiving antenna modules).

In some embodiments, the first and second panels 110, 120 may include respective pass-throughs to allow external elements of the space vehicle 100 to be coupled (e.g., communicatively) to internal elements of the space vehicle 100. In some embodiments, the pass-throughs may be holes that extend through a thickness of the respective first and second panels 110, 120.

Figure 6:
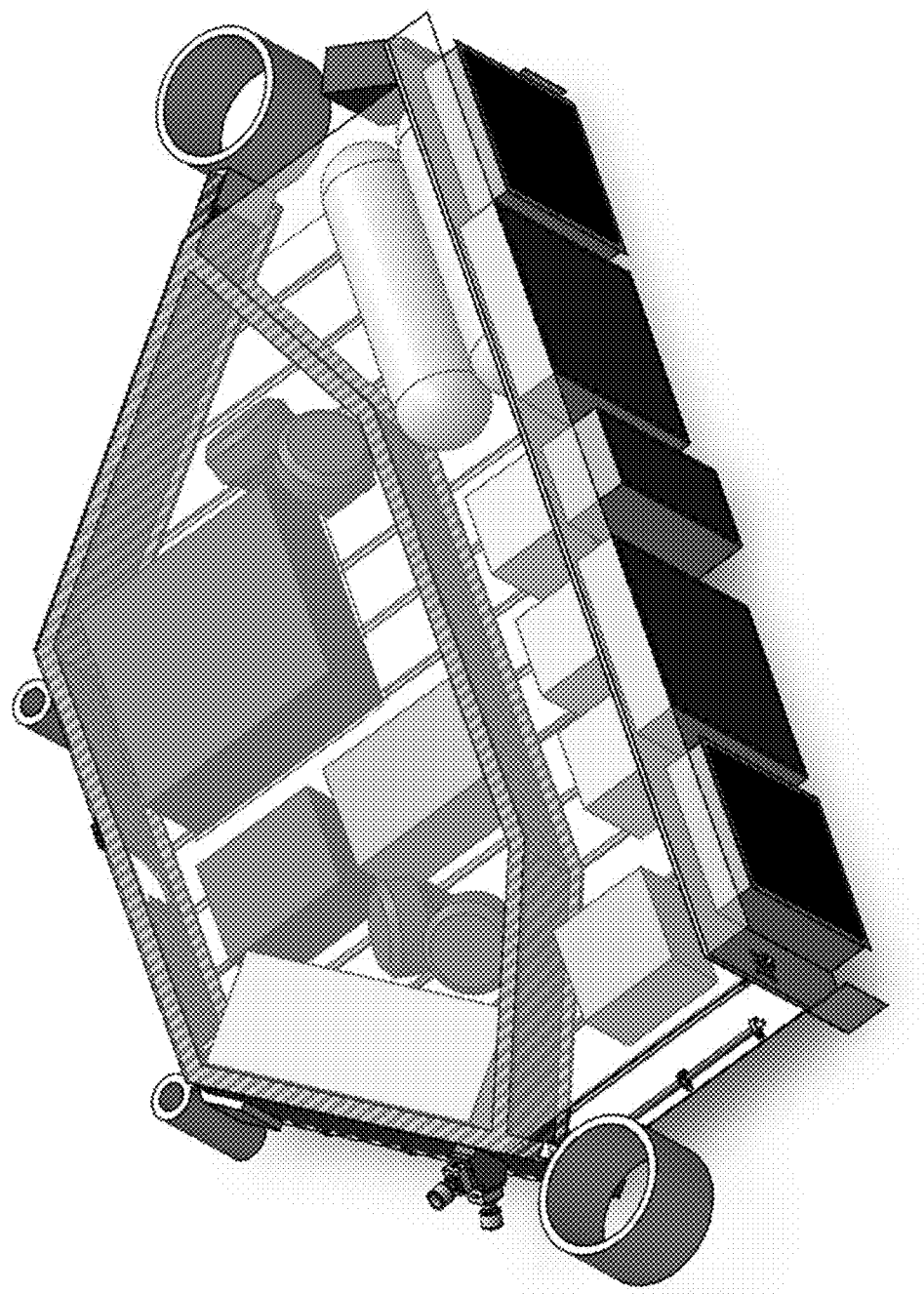
FIG. 6 shows elements of an exemplary space vehicle, according to embodiments of the present disclosure.

In some embodiments, as depicted in FIG. 6, an exemplary space vehicle 100 includes onboard equipment, such as platform equipment and payloads. In some embodiments, exemplary onboard equipment may include an on-board computer, an optical inter satellites link transceiver, a power condition and distribution unit, an on-board processor, an optical terminal, one or more reaction wheels, a power processing unit, one or more gateway interface units, a battery, or any combination thereof. The specific equipment listed above is only exemplary, and the equipment that will be included in the exemplary space vehicle 100 will vary among different implementations. In some embodiments, onboard equipment have their respective casings removed and are mounted within the exemplary space vehicle by mounting directly to one of the panels. In some embodiments, an exemplary space vehicle can therefore be referred to as a payload-integrated space vehicle.

In some embodiments, an exemplary space vehicle includes at least one stacking pillar 140. In some embodiments, an exemplary space vehicle includes two stacking pillars 140. In some embodiments, the one or more stacking pillars 140 includes two to four stacking pillars 140. In some embodiments, the one or more stacking pillars 140 includes three to four stacking pillars 140. In some embodiments, the stacking pillars are coupled to the exterior of the exemplary space vehicle. In some embodiments, the stacking pillars are coupled to a stiffener. In some embodiments, the stacking pillars allow stacking of multiple similar ones of the space vehicle on a launch vehicle without a central support structure.

Figure 7:
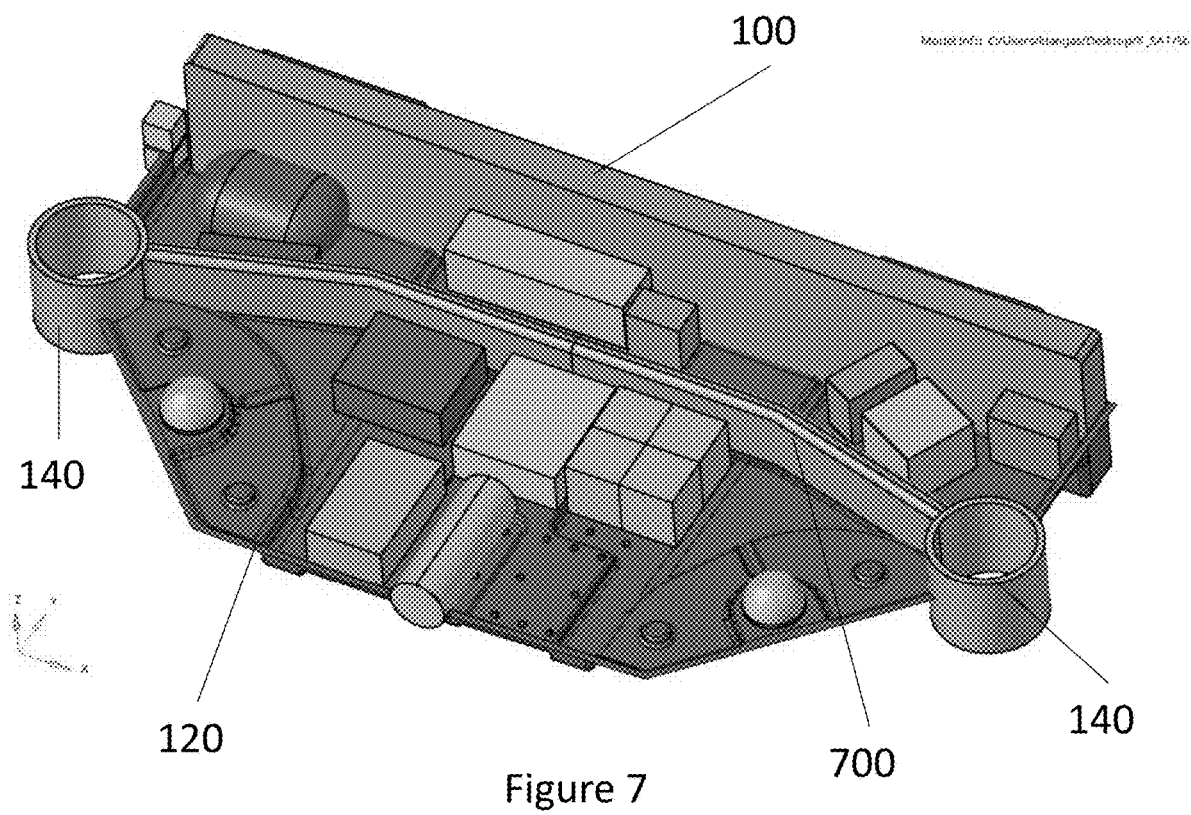
FIG. 7 shows elements of an exemplary space vehicle, including a stiffener, according to embodiments of the present disclosure.
Figures 8A, 8B, 8C, 8D:
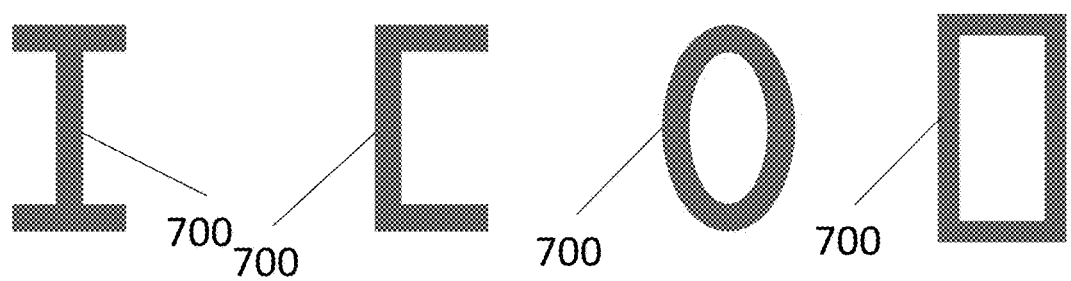
FIG. 8A shows a cross-sectional view of a stiffener of an exemplary space vehicle, according to embodiments of the present disclosure.
FIG. 8B shows a cross-sectional view of a stiffener of an exemplary space vehicle, according to embodiments of the present disclosure.
FIG. 8C shows a cross-sectional view of a stiffener of an exemplary space vehicle, according to embodiments of the present disclosure.
FIG. 8D shows a cross-sectional view of a stiffener of an exemplary space vehicle, according to embodiments of the present disclosure.

As shown in FIG. 7, the space vehicle 100 includes a stiffener 700. In some embodiments, the stiffener 700 may have a closed cross-section. In some embodiments, the stiffener 700 may have an open cross-section. In some embodiments, the stiffener 700 may have a square cross-section. In some embodiments, the stiffener 700 may have a circular cross-section. In some embodiments, the stiffener 700 may have an elliptical cross-section, as depicted in FIG. 8C. In some embodiments, the stiffener 700 may have a T-shaped cross-section. In some embodiments, the stiffener 700 may have an I-shaped cross-section, as depicted in FIG. 8A. In some embodiments, the stiffener 700 may have a C-shaped cross-section, as depicted in FIG. 8B. In some embodiments, the stiffener 700 may have a rectangular cross-section, as depicted in FIG. 8D. In some embodiments, a stiffener 700 extends spanwise across the interior of an exemplary space vehicle 100. FIG. 7 shows a perspective view of the exemplary space vehicle 100, with the panel 110 removed to show interior elements of the space vehicle 100. In some embodiments, the stiffener 700 includes a metal. In some embodiments, the metal includes aluminum. In some embodiments, the metal comprises steel. In some embodiments, the stiffener 700 comprises carbon. In some embodiments, the stiffener 700 includes carbon fiber. In some embodiments, the stiffener 700 comprises carbon polymer. In some embodiments, the stiffener 700 includes a carbon fiber reinforced polymer ("CFRP"). In some embodiments, the stiffener 700 comprises combinations of one or more of the foregoing materials.

In some embodiments, at least one of the onboard equipment is mounted directly to the stiffener 700. In some embodiments, the stiffener 700 connects to the panel 110 or the panel 120 proximate to the stacking pillars 140. In some embodiments, the stiffener 700 is bolted to the panel 110 or the panel 120. In some embodiments, the stiffener 700 connects directly to the stacking pillars 140. In some embodiments, no stiffener is included in an exemplary space vehicle. For example, FIGS. 4 and 5 show panels lacking a stiffener. In some embodiments, the stiffener 700 provides a mechanical connection between the stacking pillars 140. In some embodiments, the stacking pillars 140 are connected directly to the stiffener 700. In some embodiments, the stacking pillars 140 are connected to another structure of the space vehicle 100.

In some embodiments, each of the stacking pillars 140 includes a locking mechanism operable to releasably lock the respective one of the stacking pillars 140 stacking pillars of an adjacent space vehicle within a stack of space vehicles through the use of interface elements, as further described below. In some embodiments, the locking mechanism comprises an internal locking mechanism.

In some embodiments, an exemplary space vehicle includes an electrical propulsion unit. In some embodiments, the electrical propulsion unit is an ion propulsion unit. In some embodiments, the electrical propulsion unit is a plasma propulsion unit. In some embodiments, the electrical propulsion unit includes fuel.

In some embodiments, the first and second panels 110, 120 of an exemplary space vehicle may be configured as an upper panel and a lower panel. In some embodiments, the upper panel and the lower panel are attached to one another to form an enclosed body within which platform hardware and payloads are accommodated. In some embodiments, the interior of an exemplary space vehicle (e.g., an interior space as defined between two joined panels) is pressurized. In some embodiments, the exterior of the exemplary space vehicle (e.g., the perimeter of the first and second panels 110, 120 described above) is hermetically sealed in order to allow the interior to be pressurized. In some embodiments the interior is pressurized to a pressure that is in a range of from 1 bar to 2 bar. In some embodiments, the interior pressure is from 1.2 bar to 2 bar. In some embodiments, the interior pressure is from 1.4 bar to 2 bar. In some embodiments, the interior pressure is from 1.6 bar to 2 bar. In some embodiments, the interior pressure is from 1.8 bar to 2 bar.

In some embodiments the interior is pressurized to a pressure that is in a range of from 1 bar to 1.8 bar. In some embodiments, the interior pressure is from 1 bar to 1.6 bar. In some embodiments, the interior pressure is from 1 bar to 1.4 bar. In some embodiments, the interior pressure is from 1 bar to 1.2 bar.

In some embodiments, the interior pressure is from 1.2 bar to 1.8 bar. In some embodiments, the interior pressure is from 1.4 bar to 1.6 bar. In some embodiments, the interior pressure is from 1.6 bar to 1.8 bar. In some embodiments, the interior pressure is from 1.2 bar to 1.4 bar.

In some embodiments, the interior is pressurized with a gas. In some embodiments, the gas is a convection gas. In some embodiments, the convection gas facilitates convection of heat within the space vehicle. In some embodiments, the gas is nitrogen.

Figure 9:
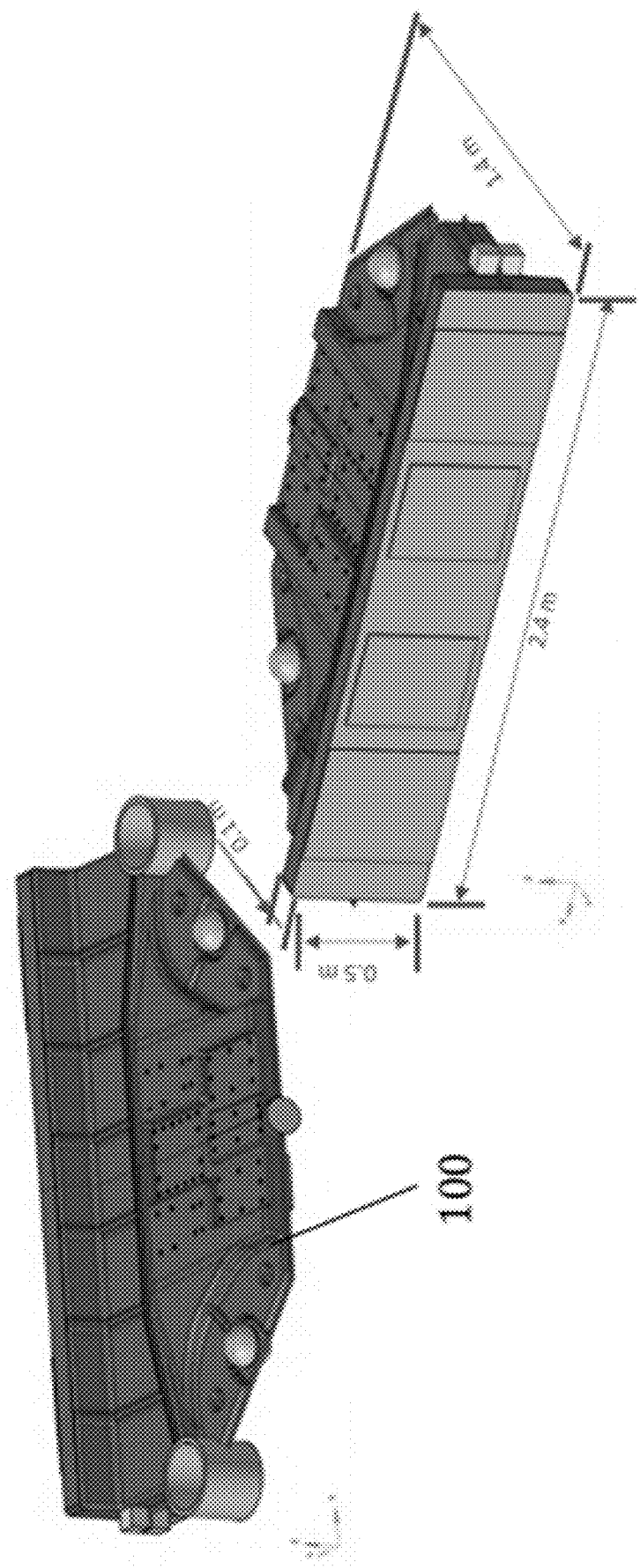
FIG. 9 shows dimensions of an exemplary space vehicle, according to embodiments of the present disclosure.

In some embodiments, the exemplary space vehicle 100 that is shaped as shown in FIGS. 1 and 2, and which has stacking pillars 140 positioned as shown in FIGS. 1 and 2, is suitable for stacking, for example, either four of the space vehicles 100 or six of the space vehicles 100 in a single layer on a launch vehicle. As discussed in detail below, in some embodiments, the exemplary space vehicle 100 is appropriately sized and shaped to allow placement of four of the exemplary space vehicles 100 in a single layer of a launch stack that fits within a circle 4.5 meters in diameter, such as within the fairing of a rocket or other launch vehicle which has a diameter of 5 meters. In some embodiments, such sizing and placement are suitable for use on a launch vehicle that is 5 meters in diameter. Also as discussed in further detail below, in some embodiments, the exemplary space vehicle 100 is also appropriately sized and shaped to allow placement of six of the exemplary space vehicles 100 in a single layer of a launch stack that fits within a circle 6.35 meters in diameter. In some embodiments, such sizing and placement are suitable for use on a launch vehicle or rocket having a fairing that is which has a diameter of 7 meters in diameter. FIG. 9 shows sizing of an exemplary space vehicle 100. The sizing shown in FIG. 9 is only exemplary and that a space vehicle manufactured in accordance with the exemplary embodiments disclosed herein may also have any other dimensions.

In some embodiments, an exemplary space vehicle is made by a process including providing a quantity of sheet aluminum; forming at least a first panel and a second panel from the sheet aluminum by press-forming; providing at least one onboard equipment component, wherein the at least one onboard equipment component has no outer casing; fixing the at least one onboard equipment component to the first panel; and sealing the first panel to the second panel to form the space vehicle.

In some embodiments, a process for making an exemplary space vehicle 100 includes providing aluminum sheets; press-forming the aluminum sheets to produce a first stamped panel and a second stamped panel; providing a stiffener; fixing the stiffener to the first stamped panel such that the stiffener extends across a width of the first panel, wherein a first end of the stiffener is attached to the first panel at a first fixation location, and wherein a second end of the stiffener is attached to the second panel at a second fixation location; fixing a plurality of onboard equipment elements to the first stamped panel, wherein at least one of the plurality of onboard equipment elements has a casing removed therefrom, and wherein at least one of the plurality of onboard equipment elements is further fixed to the stiffener.

By providing a space vehicle structure made of stamped material, the exemplary embodiments provide space vehicles that can be designed and manufactured at a lower overall cost than space vehicles that incorporate honeycomb panels. Additionally, the shape of the primary structure of the exemplary space vehicles can be optimally designed to cater to the functional needs at a given location within the vehicle. Further, a stamped structure provides improved design predictability using computer-assisted engineering ("CAE") tools, thereby enabling overengineering to be avoided and saving weight in the exemplary space vehicle.

While a number of embodiments of the present invention have been described, it is understood that these embodiments are illustrative only, and not restrictive. For example, all dimensions discussed herein are provided as examples only, and are intended to be illustrative and not restrictive.

What is claimed is:

1. A method comprising:
   providing a quantity of sheet metal,
      wherein the sheet metal comprises aluminum;
   press-forming a first panel from the sheet metal to form a first stamped panel;
   press-forming a second panel from the sheet metal to form a second stamped panel;
   providing at least one stiffener;
   fixing the at least one stiffener to the first stamped panel such that the stiffener extends across a width of the first panel,
      wherein a first end of the stiffener is attached to the first stamped panel at a first fixation location, and
      wherein a second end of the stiffener is attached to the first stamped panel at a second fixation location;
   providing at least one onboard equipment component;
   fixing the at least one onboard equipment component to the first stamped panel,
      wherein the at least one onboard equipment component does not comprise an outer casing, wherein the at least one onboard equipment component is fixed to the stiffener; and sealing the first panel to the second panel to form a space vehicle.

2. The method of claim 1, further comprising:

providing at least one stacking pillar;

coupling the at least one stacking pillar to the space vehicle, wherein the at least one stacking pillar is configured to allow stacking of the space vehicle with at least one other space vehicle.

3. The method of claim 1, wherein fixing the at least one stiffener to the first stamped panel comprises bolting the at least one stiffener to the first stamped panel.

4. The method of claim 1, further comprising forming a layer of satellites by placing four of the space vehicles in a single layer within a circle having a diameter of 4.5 meters.

5. The method of claim 1, wherein the stiffener comprises one of a circular cross-section, a T-shaped cross-section, an elliptical cross-section, an I-shaped cross-section, a C-shaped cross-section or a rectangular cross-section.

6. The method of claim 1, further comprising:

forming at least one pass-through through at least one of the first stamped panel or the second stamped panel, wherein the at least one pass-through is configured to allow communitive coupling of at least one external component of the space vehicle to at least one internal component of the space vehicle.

7. The method of claim 1, wherein each of the first stamped panel and the second stamped panel comprises a thickness of 0.1 mm to 10 mm.

8. The method of claim 1, wherein sealing the first panel to the second panel comprises welding at least a portion of a perimeter of the first stamped panel to a least a portion of a perimeter of the second stamped panel.

9. The method of claim 1, wherein sealing the first panel to the second panel comprises welding an entire perimeter of the first stamped panel to an entire perimeter of the second stamped panel.

10. The method of claim 1, wherein the space vehicle does not comprise an aluminum honeycomb core.

11. The method of claim 1, wherein the sheet metal comprises an aluminum alloy.

12. The method of claim 1, wherein the stiffener comprises an aluminum, a carbon fiber, or a carbon fiber reinforced polymer.

13. The method of claim 1, wherein the at least one onboard equipment component comprises at least one of an on-board computer, an optical inter satellites link transceiver, a power condition and distribution unit, an on-board processor, an optical terminal, one or more reaction wheels, a power processing unit, one or more gateway interface low and high power amplifiers, or a battery.

14. The method of claim 1, wherein the at least one onboard equipment component comprises a plurality of onboard equipment components, and wherein fewer than all of the plurality of onboard equipment components are fixed to the stiffener.

\* \* \* \* \*